United States Patent [19]
Stluka

[11] Patent Number: 4,623,197
[45] Date of Patent: Nov. 18, 1986

[54] SLOPED FLOOR DUMP TRAILER
[75] Inventor: Eugene F. Stluka, Haverford, Pa.
[73] Assignee: Florig Equipment Company, Inc., Conshohocken, Pa.
[21] Appl. No.: 767,929
[22] Filed: Aug. 20, 1985
[51] Int. Cl.⁴ .............................................. B60P 1/16
[52] U.S. Cl. ..................... 298/10; 296/184; 296/182; 296/204; 298/1 H; 298/22 R; 298/23 R; 298/23 C; 298/24; 210/534
[58] Field of Search ............ 296/204, 182, 183, 184; 298/23 C, 1 R, 1 H, 10, 11, 19 R, 17 R, 22 R, 22 AE, 22 C, 22 F, 22 J, 22 P, 22 A, 22 B, 22 D, 19 B, 17.5, 23 R; 210/534

[56] References Cited
U.S. PATENT DOCUMENTS

| 1,337,215 | 4/1920 | Fowler | 210/534 |
|---|---|---|---|
| 1,740,779 | 12/1929 | Nolen et al. | 298/23 C |
| 1,961,193 | 6/1934 | Brumbaugh | 298/23 R X |
| 2,674,489 | 4/1954 | Maxon, Jr. | 298/22 R X |
| 2,761,730 | 9/1956 | Black, Jr. | 298/22 R |
| 2,889,172 | 6/1959 | Hoff | 298/22 P X |
| 2,974,997 | 3/1961 | Parsley et al. | 298/1 H X |
| 3,159,420 | 12/1964 | McCrossen | 296/183 |
| 3,412,883 | 11/1968 | Birdsall | 298/22 P X |
| 3,472,548 | 10/1969 | Comisac | 296/184 |
| 3,720,446 | 3/1973 | Kelley | 298/22 R |

FOREIGN PATENT DOCUMENTS 746737 3/1956 United Kingdom .............. 298/1 H

Primary Examiner—Frank E. Werner
Attorney, Agent, or Firm—Benasutti and Murray

[57] ABSTRACT

A sloped floor trailer which incorporates drain ports which are opened during trailer loading and which are sealed during trailer transportation, in order to retain the liquid. In addition to the foregoing features, I provide apparatus for heating the trailer side walls with the truck tractor exhaust to prevent freezing during inclement weather.

11 Claims, 3 Drawing Figures

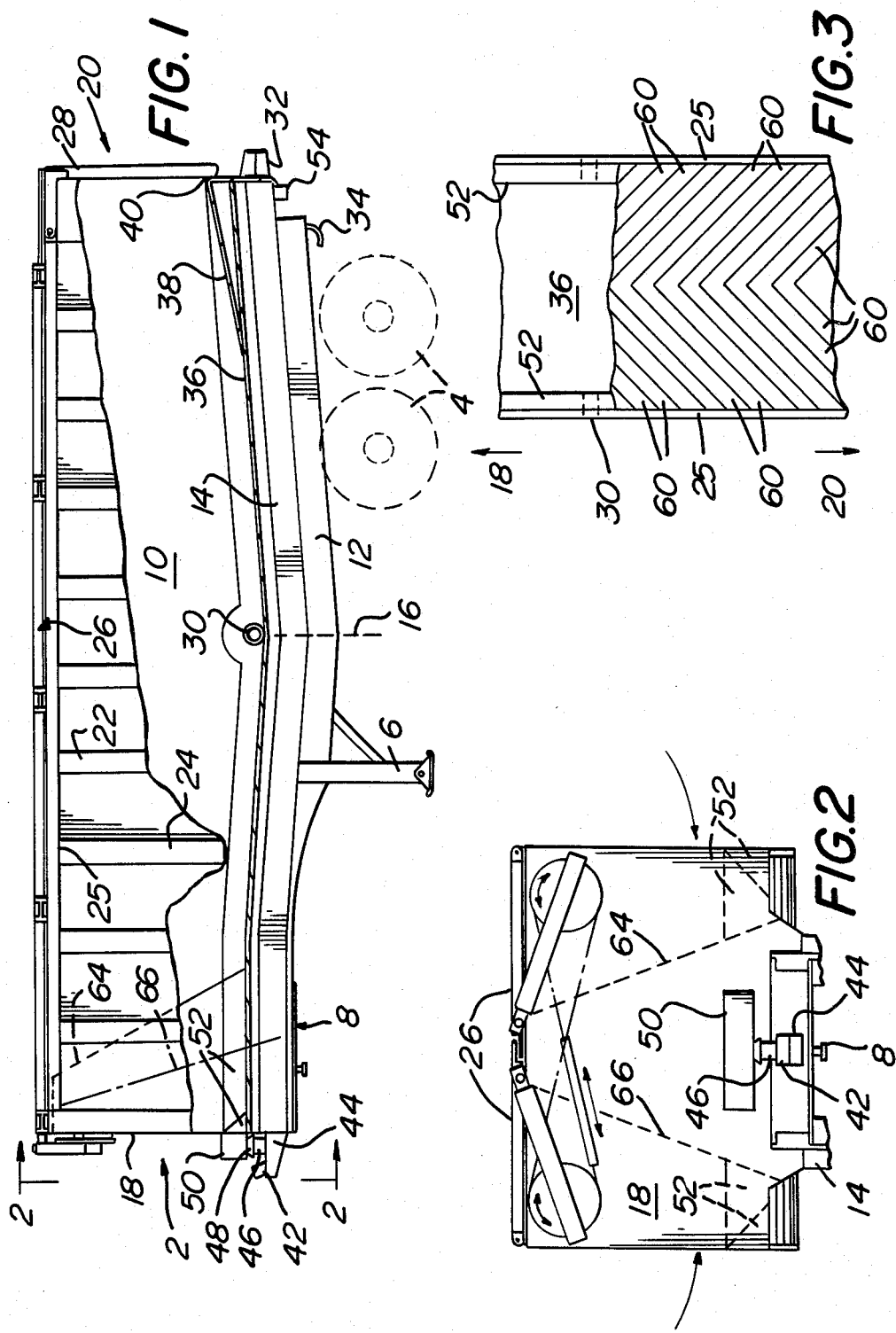

SLOPED FLOOR DUMP TRAILER

BACKGROUND OF THE INVENTION

The present invention relates to dump trailer in general and in particular to dump trailer intended for use in hauling liquid containing residue.

In many applications, such as the hauling of incinerator residue and hazardous material, it is essential that the solid material be hauled on public highways without permitting contaminated fluid to drip from the trailer. On prior art attempt to meet this requirement has been the utilization of water tight dump gates. However, trailers utilizing water tight dump gates generally do not provide any means for draining liquid from the residue and it is often necessary to haul materials containing excessive amounts of liquid. Hauling the excess liquid is troublesome for two reasons. In the first instance, there is always the potential for damage to the trailer which will result in liquid spillage. In the second instance, transporting unnecessary liquid adds to the weight of the load and thereby increases transportation cost, road damage and dumping cost. In addition to the foregoing, it is often difficult to maintain the integrity of the watertight dump gates, due to use damage and wear, and dripping liquid is a common problem.

In addition to the foregoing, excess liquid can frequently cause problems in dumping of the load at waste disposal sites. Problems associated with dumping can be caused by additional packing of the materials as well a freezing of the liquid, in those climates which are subject to adverse weather conditions.

In an effort to overcome the prior art difficulties in purging the residue of excess liquid and in transporting the residue with the remaining unpurged liquid, I have provided a trailer which incorporates a means for draining the liquid during loading, a sloped floor for retaining additional liquid which settles during transportation and a means for heating the trailer, using the tractor exhaust, to prevent freezing.

SUMMARY OF THE INVENTION

In accordance with the invention, my trailer incorporates drain ports which are opened during trailer loading and which are sealed during trailer transportation. In order to retain the liquid, I provide a contoured or sloped floor which is sufficient in size to retain additional liquid settlement during transport of the load. In addition to the foregoing features, I provide a means for heating the trailer side walls as a means of preventing freezing during inclement weather.

BRIEF DESCRIPTION OF THE DRAWINGS

FIG. 1 is a side elevation of a trailer body according to my invention.

FIG. 2 is a front, plane view of the trailer bed taken along the line 2—2 of FIG. 1.

FIG. 3 is an illustration of a section of the floor of the trailer depicting the floor supports and the side wall heating means.

DESCRIPTION OF THE PREFERRED EMBODIMENT

With reference to FIG. 1, there is shown a side elevation of the trailer in accordance with the instant invention. The trailer 2 is intended to be hauled by a tractor as is commonly known in the trucking industry. The trailer 2 has rear wheels and suspension 4 shown in phantom, which are known to those skilled in the art and form no part of the instant invention. Likewise, retractable landing gear 6 is provided for stabilizing trailer when at rest. A king pin 8 for attachment to a fifth wheel, as is known to those in the art, is also provided. Likewise the trailer 2 is provided with a rear pivot, not shown, to enable the trailer to be raised vertical and pivot for dumping. A trailer is currently being constructed in accordance with my invention for field testing. The experimental model is a 25 cubic yard dump trailer with an inside length of 22 feet, an overall width of 96 inches, an overall height of 126 inches and has offset hinges to provide maximum dump gate clearance.

The trailer 2 has a trailer dump bed 10 which is intended to provide a receptacle for the liquid container residue which is to be hauled. The trailer bed 10 is mounted on main chassis rails 12 and body rails 14. Main chassis rails 12 and body rails 14 are sloped toward the vertical axis as indicated at 16. The vertical axis 16 is located at about the mid-point of bed 10, but may be located elsewhere according to applications. Rails 12 and 14 slope from the tractor end 18 of the trailer downwardly toward the vertical axis 16, and slope from the distal end 20 of the trailer downwardly toward the vertical axis 16. Accordingly, it can be seen that the floor of the trailer will slope from the respective ends of the trailer downwardly toward the vertical axis 16. The trailer bed 10 is generally defined by side walls 22 which are reinforced with hollow vertical beams 24, and horizontal hollow beams 25, a similar front wall is provided at the tractor end. This construction of the trailer bed will be familiar to those skilled in the art.

As will also be familiar to those skilled in the art, the trailer may be provided with top cover lids 26 which may be opened to gain access to the trailer bed, such as during initial loading or in route inspection. Means for opening the trailer lids 26 will be discussed hereinafter with reference to FIG. 2. In addition to the trailer lids 26, the trailer is provided with a water tight dump gate 28. Water tight dump gates such as 28 will be known to those skilled in the art.

With reference to the side wall 22 of the trailer, it will be noted that a drain port 30 is provided in the side wall, at the base thereof adjacent the trailer bed floor, on the vertical axis 16. The drain port 30 is left open during the loading of the trailer and permits liquid to drain from the materials loaded in the trailer bed at the site of loading. After the trailer has been loaded, the drain ports are sealed and liquid is retained in the trailer bed during transportation upon public highways. It will be understood by those skilled in the art that a drain port 30 may be provided on either side wall of the trailer. In the preferred embodiment, the drain port 30 is approximately a 6 inch diameter externally threaded pipe which is fixed to the side wall and extends inwardly to the trailer floor. Draining port 30 is closed using a complementary internally threaded cap and gasket.

With respect to the floor of the trailer bed, it can be seen that the floor 36 generally follows the contour established by the main chassis rails 12 and body rails 14. However, at the distal end 20 of the trailer, the floor is elevated as illustrated by floor plate 38. Floor plate 38 extends across the width of the trailer and has a length of approximately, one-sixth of the total trailer length. Floor plate 38 is positioned at the distal end of the trailer 20 so as to be at an elevation equal to the seal formed between the dump gate 28 and the trailer body, as illustrated at point 40.

Through a combination of the sloped flooring and the elevated floor plate 38, I am able to provide a trailer of standard width and of approximately 30 feet in length which can retain approximately 850 gallons of liquid, resting on a level, without any spillage over the point 40 with the tailgate 28 in an open position. The ability to retain this amount of liquid without reliance upon the dump gate seal, greatly reduces the criticality of the dump gate seal and minimizes the detrimental effect of damage to the dump gate resulting from abuse or wear during dumping of the trailer.

With reference to heating the trailer, there is shown in FIG. 1, an exhaust nipple 42. An exhaust lead, not shown, is attached from the exhaust of the tractor to the nipple 42. From nipple 42, the exhaust is directed into a collector box 44. Attached to collector box 44, is an exhaust duct 46 which has a funnel or conelike union attached to the end thereof. The nipple 42, collector 44, duct 46 and union 48 are affixed to and remain stationary with the trailer chassis. Attached to the trailer bed and movable therewith during dumping is a collector 50 which is dimensioned to complement union 48. On the inside of the trailer bed extending across the trailer end and down the side walls is a duct system 52. The duct system 52 is fabricated by mounting steel plate on the hypotenuse of a triangle formed between the trailer bed walls and the trailer floor. In the preferred embodiment, the duct system 52 is sized to provide an open area which is approximately twice the open area of the exhaust pipe normally found in commercially available tractors. In addition to extending along the base of the trailer bed, the duct system 52 has a plurality of openings, each of which is positioned below and in communication with a hollow vertical beam 24. In addition, the hollow vertical beams 24 are open, and a hollow horizontal beam 25 is provided about the perimeter of the top of the trailer bed. Hollow vertical beams 24 and horizontal beam 25 are in open communication and exhaust which enters the nipple 42 is ultimately permitted to circulate through duct work 52, hollow beams 24 and 25 so as to heat the perimeter of the trailer floor, the tractor end and the side walls of the trailer. Ultimately egress of the exhaust is accomplished through a downwardly disposed exhaust port 54 which is positioned at the distal end of the trailer. It will be noted that the exhaust duct 52 is suitable dimensioned, in the preferred embodiment, to provide the desired exhaust area around the drain port 30.

With reference to FIG. 2, there is shown an end elevation in partial section of the tractor end of the trailer. In this Figure, there is illustrated a hydraulically actuated chain and sprocket mechanism for opening and closing the complimentary sections of trailer cover lids 26. This mechanism is actuated by a hand lever which is mounted in a position accessible to the tractor operator. The mechanism for opening and closing the lids does not form part of the invention described and claimed herein.

With reference to FIG. 3, there is shown a fragmentary section of the floor 36 in the bed 10 of trailer 2. The floor 36 is fabricated from heavy sheet steel as known to those skilled in the art. However, the supports 60 which reinforce the floor 36 are not aligned in the conventional manner. In a conventional support arrangement, the support beams are arranged so as to extend horizontally between the sides of the trailer. However, in the preferred embodiment, the support beams are arranged in a herring bone or chevron pattern which meet at the center and form about a 45° angle with the center line of the trailer. The herring bone arrangement, in addition to resisting denting of the floor bed 36 (which results in a wash board or ripple effect in the floor) provides additional strength to the trailer bed. This additional strength, is especially helpful in dumping of trailers which are subjected to torsion resulting from vibrations and unleveled dumping. The herring bone or chevron pattern acts as a spine to resist torsional twist which may distort the body. Dump trailers, due to their extended length, sometimes in excess of 30 feet, are especially susceptible to these torsional forces which can result in substantial damage to the dump body.

With respect to dumping, reference is made to FIG. 1. In FIG. 1, there is shown in phantom, the interior housing 64 which contains a telescoping hoist 66 which is also shown in phantom. The use of a telescoping hoist will be known skilled in the art and does not form any part of the invention. However, with respect to the angle achieved by the hoist, it will be noted that a dumping angle of 45° is commonly accepted in use with dump trailers having a distally mounted dump gate and planar floor surfaces. However, due to the sloped floor of the instant trailer, the telescoping hoist has been provided with additional boom length so as to achieve a minimum dump angle of at least 55°. By increasing the minimum dump angle of the hoist, it is possible to compensate for the sloped floor 36 and the elevated floor portion 38. As will be appreciated by those skilled in the art, the incorporation of the elevated floor portion 38 reduces the area of the opening at the dump gate as opposed to the open area of the remainder of the trailer body and may result in restriction of the dump opening. Accordingly, this has been compensated for by increasing the minimum dump angle by an amount sufficient to assure that the point 40 will be rotated sufficiently so as to permit complete dumping of the materials from the trailer.

It will be noted that there are no moving parts exposed in the interior of the disclosed dump trailer. Accordingly, there are no moving parts which can be damaged during loading or dumping of the disclosed trailer.

I claim:

1. An improved tow trailer having ground engaging support means and a trailer body for hauling and dumping liquid containing residue, wherein the trailer provides hoist elevation means for raising one end of the body for dumping said body, the improvement comprising:
   (a) main chassis rails which slope from the respective ends of the trailer toward a common vertical axis;
   (b) body rails resting on said chassis rails and sloping from the respective ends of said trailer toward said vertical axis;
   (c) a plurality of floor support means, positioned adjacent to said body rails, for providing a support plane which slopes from the respective ends toward said vertical axis;
   (d) a floor mounted on said plurality of support means and sloping from said respective ends towards said vertical axis;
   (e) vertical walls mounted about the perimeter of said floor on both sides and one end thereof;

(f) a dump gate pivotally supported by said side walls and positioned at the other end thereof; and (g) an elevated floor portion positioned adjacent to said dump gate and sloping from the sealing point of said dump gate toward said common vertical axis; and (h) at least one closable drain port positioned at said vertical axis in a side wall adjacent to and at the lowest point of said floor.

2. The trailer of claim 1, wherein said floor support means comprises support beams extending between said body rails, said beam ends being uniformly non-perpendicular to said body rails so that a chevron pattern of said beams is created.

3. The trailer of claim 1, further comprising wheeled trailer support means, adjacent said main chassis rails, for supporting said trailer and for enabling said trailer to be moved.

4. The trailer of claim 3, wherein said trailer support means further comprises a trailer hitch for attaching said trailer to a truck tractor.

5. The trailer of claim 3, wherein said trailer support means further comprises retractable landing gear for stabilizing said trailer when it is not in motion.

6. The trailer of claim 1, further comprising top cover lids which extend for the length of the trailer and open to permit access to the body.

7. The trailer of claim 1, wherein the hoist elevation means comprises telescoping dumping means for dumping residue from said body.

8. The trailer of claim 7, wherein said dumping means comprises a telescoping hoist which provides a minimum dumping angle of at least 55°.

9. The trailer of claim 1, further comprising means for heating said residue contained in said body.

10. The trailer of claim 9, wherein said means for heating said residue comprises a conduit for attachment to a truck tractor exhaust system, said conduit providing means for directing exhaust gases from said exhaust system to duct work dispersed throughout the periphery of said body and terminating in an exhaust port.

11. An improved combination in a towable trailer having ground engaging support means and a trailer body for holding and dumping liquid containing residue wherein the trailer provides hoist elevation means for raising one end of said body for dumping said body, the improvement comprising:

(a) body rails which slope from the respective ends of the trailer toward a common vertical axis;

(b) a plurality of floor support means positioned adjacent to said body rails and forming a support plane which slopes from the respective ends toward said common vertical axis;

(c) a floor mounted on said plurality of floor support means and sloping from said respective ends towards said common vertical axis;

(d) vertical walls mounted about the perimeter of said floor on both sides and one end thereof;

(e) a dump gate pivotally supported by said side walls and positioned at the other end thereof;

(f) an elevated floor portion positioned adjacent to said dump gate and sloping from the sealing point of said dump gate toward said common vertical axis; and (g) at least one drain port positioned at said common vertical axis in a side wall adjacent said floor.

* * * * *